United States Patent
Han et al.

(10) Patent No.: US 9,454,339 B2
(45) Date of Patent: Sep. 27, 2016

(54) DISPLAY APPARATUS, VIDEO WALL APPARATUS, DISPLAY METHOD AND VIDEO WALL DISPLAY METHOD

(71) Applicant: SAMSUNG ELECTRONICS CO., LTD., Suwon-si (KR)

(72) Inventors: Young-ran Han, Seoul (KR); Ju-yong Kim, Suwon-si (KR); Hee-won Lee, Paju-si (KR); Kyoung-oh Choi, Seoul (KR); Hyun-mook Choi, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 230 days.

(21) Appl. No.: 14/104,076

(22) Filed: Dec. 12, 2013

(65) Prior Publication Data

US 2014/0168185 A1   Jun. 19, 2014

(30) Foreign Application Priority Data

Dec. 13, 2012   (KR) .......................... 10-2012-0145487

(51) Int. Cl.
*G06F 3/14*   (2006.01)
*G09G 5/02*   (2006.01)
*G02F 1/1333*   (2006.01)

(52) U.S. Cl.
CPC ......... *G06F 3/1446* (2013.01); *G02F 1/13336* (2013.01); *G09G 5/02* (2013.01); *G02F 2202/32* (2013.01); *G09G 2300/026* (2013.01)

(58) Field of Classification Search
CPC ................. G06F 3/14; G06F 3/1423–3/1446; G09G 3/34–3/3466; G09G 5/02–5/06; G09G 2300/02–2300/026; G09G 2300/0421–2300/0434; G09G 2300/0469; G09G 2300/0473; G09G 2310/0232; G02F 1/13336; G02F 2202/32
See application file for complete search history.

(56) References Cited

U.S. PATENT DOCUMENTS

| | | | |
|---|---|---|---|
| 2009/0086208 A1* | 4/2009 | Kang | B82Y 20/00 356/402 |
| 2009/0289874 A1* | 11/2009 | Ha | H04N 7/0122 345/1.3 |
| 2010/0033402 A1* | 2/2010 | Yoshida | G06F 3/1446 345/1.3 |
| 2011/0018849 A1* | 1/2011 | Lowe | G09G 5/003 345/205 |
| 2012/0133672 A1* | 5/2012 | Joo | G09G 3/3446 345/594 |

* cited by examiner

*Primary Examiner* — Nathan Danielsen
(74) *Attorney, Agent, or Firm* — Sughrue Mion, PLLC

(57) ABSTRACT

A display apparatus is disclosed. The display apparatus includes a display panel, a photonic crystal array which is arranged on at least one side of the display panel and displays an image based on an applied voltage, an electrode which applies voltage to the photonic crystal array, and a controller which controls so that voltage is applied to the photonic crystal array based on image information displayed on the display panel.

18 Claims, 10 Drawing Sheets

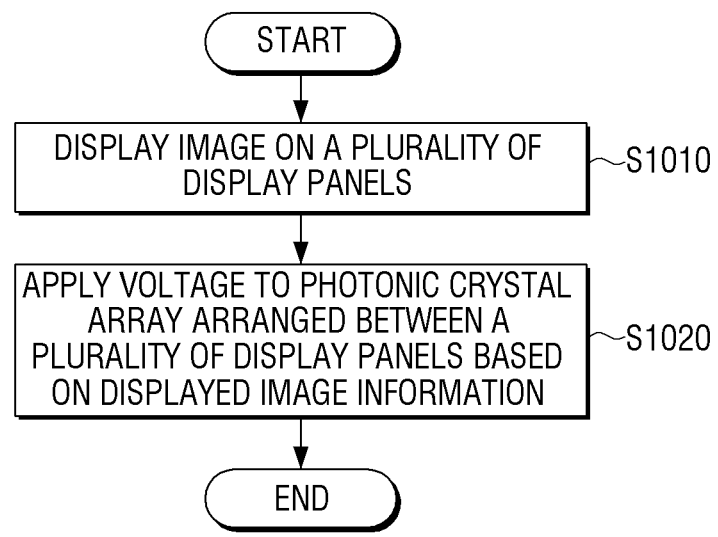

DISPLAY APPARATUS, VIDEO WALL APPARATUS, DISPLAY METHOD AND VIDEO WALL DISPLAY METHOD

CROSS-REFERENCE TO RELATED APPLICATION

This application claims priority from Korean Patent Application No. 10-2012-145487, filed on Dec. 13, 2012 in the Korean Intellectual Property Office, the disclosure of which is incorporated herein by reference in its entirety.

BACKGROUND

1. Field

Apparatuses and methods consistent with exemplary embodiments relate to a video wall, and more specifically, to a display apparatus which displays a seamless video wall image between separate display apparatuses constituting a video wall apparatus, a video wall apparatus thereof, a display method and a display method of the video wall apparatus.

2. Description of the Related Art

'Video wall' is technology which expresses one image by utilizing a plurality of display apparatuses for the purpose of advertising, entertainment, sports or broadcasting.

For example, video wall is used when each of display apparatuses constituting one video wall displays uniform image simultaneously, or different images respectively in a format combined with one whole mobilized image on a video wall at the venues such as exhibits, etc. In this case, several new technological methods to display a natural and united image can be considered.

Specifically, when a plurality of display apparatuses are arranged and display one whole mobilized image, it is necessary to display a seamless natural image. However, because each display apparatus may necessarily include a display panel and a bezel which supports a display panel, difficulty may happen to implement a seamless image. In other words, a bezel is mounted by surrounding a display panel and the bezel area is not where an image is displayed. Thus, if a plurality of display apparatuses are arranged, the displayed image stops at the bezel area. Specifically, because two display apparatuses have a bezel in each, the area having a discontinued part of an image spans substantially the width of the two bezels on a video wall.

Because seams occur in the image due to bezels, video wall technology has limitations in displaying an entire, naturally mobilized image. Therefore, many manufacturers make efforts to produce a bezel width of a display apparatus as narrow as possible. However, since it is impossible to remove a bezel from a display apparatus, it has been long-standing challenge to reduce the influence of a bezel in the video wall technological field.

SUMMARY

Exemplary embodiments of the present inventive concept overcome the above disadvantages and other disadvantages not described above. Also, the present inventive concept is not required to overcome the disadvantages described above, and an exemplary embodiment of the present inventive concept may not overcome any of the problems described above.

According to an exemplary embodiment, a technical objective is to provide a display apparatus which displays seamless video wall image by employing a means for displaying image on a bezel area of the display apparatus, a video wall apparatus, a display method and a video wall apparatus display method.

According to an exemplary embodiment, a display apparatus includes a display panel, a photonic crystal array which is arranged on at least one side of the display panel and displays an image, an electrode which applies voltage to the photonic crystal array, and a controller which controls applying voltage to the photonic crystal array based on image information displayed on the display panel.

The display apparatus may additionally include a bezel which is arranged on an edge of the display panel and the photonic crystal array is arranged on at least one area of the bezel.

Further, the controller may control so that voltage is applied to the photonic crystal array based on color information of the image which is displayed on a predetermined area of the display panel.

The controller may establish a predetermined area of the display panel as an image block, calculate an average pixel value from pixel values of the established image block or calculate a pixel value having a highest frequency from the established image block, and control so that voltage is applied to the photonic crystal array according to the calculated pixel value.

The controller may establish a predetermined area of the display panel as an image block, convert pixel values of the established image block to a pixel value in Hue type, calculate an average pixel value from the converted pixel values or calculates a pixel value having the highest frequency from the converted pixel values, and control so that voltage is applied to the photonic crystal array according to the calculated pixel value.

The photonic crystal array may include an electro solvent whose ionic concentration changes by the applied voltage, and photonic crystal which contacts the electro solvent.

The photonic crystal is a material whose domain periodic structure can change reversibly so as to influence electromagnetic radiation by electrical stimulation or by changes in ionic concentration, and may be diblock copolymer constituting a hydrophobic block polymer and a hydrophilic block polymer.

According to an exemplary embodiment, a video wall apparatus includes a plurality of display apparatuses, at least one of the plurality of the display apparatuses comprising a display panel, a photonic crystal array which is arranged on at least one side of the display panel and which display an image, an electrode which applies voltage to the photonic crystal array, and a controller which controls so that voltage is applied to the photonic crystal array based on image information displayed on the display panel.

Further, according to an exemplary embodiment, a video wall apparatus comprises a plurality of display panels, a photonic crystal array which is arranged between the plurality of display panels and displays image, an electrode which applies voltage to the photonic crystal array, and a controller which controls so that voltage is applied to the photonic crystal array based on image information displayed on the plurality of display panels.

According to an exemplary embodiment, a display method includes displaying a first image on a display panel, and applying voltage to a photonic crystal array based on displayed image information. The photonic crystal array is arranged on at least one side of the display panel and displays a second image based on the applied voltage.

The photonic crystal array may be arranged on at least one area of a bezel mounted on an edge of the display panel.

The applying voltage may comprise applying voltage to the photonic crystal array based on color information of the first image displayed on a predetermined area of the display panel.

Further, the applying voltage may include establishing a predetermined area of the display panel as image block, calculating an average pixel value from pixel values of the established image block or pixel value having the highest frequency from the established image block, and applying the voltage according to the calculated pixel value to the photonic crystal array.

The applying voltage may include establishing a predetermined area of the display panel as an image block, converting pixel values of the established image block to a pixel value in Hue type, calculating an average pixel value from the converted pixel values or calculating pixel value having a highest frequency from the converted pixel values, and applying voltage according to the calculated pixel value to the photonic crystal array.

The photonic crystal array may include electro solvent whose ionic concentration changes in response to the applied voltage, and photonic crystal which contacts the electro solvent.

The photonic crystal is material whose domain periodic structure can change reversibly so as to influence electromagnetic radiation by electrical stimulation or by changes in ionic concentration, and may be a diblock copolymer constituting a hydrophobic block polymer and a hydrophilic block polymer.

According to another exemplary embodiment, there is provided a display apparatus, comprising: a display panel; means for displaying an image which is arranged on at least one side of the display panel; an electrode which applies voltage to the means for displaying the image; and a controller which controls so that voltage is applied to the means for displaying the image based on image information displayed on the display panel, wherein the display panel and the means for displaying the image are different elements.

According to yet another exemplary embodiment, there is provided a video wall apparatus comprising a plurality of the display apparatuses, at least one of the plurality of the display apparatuses comprising: a display panel; means for displaying an image which is arranged on at least one side of the display panel; an electrode which applies voltage to the means for displaying the image; and a controller which controls so that voltage is applied to the means for displaying the image based on image information displayed on the display panel, wherein the display panel and the means for displaying the image are different elements.

According to yet another exemplary embodiment, there is provided a video wall apparatus, comprising: a plurality of display panels; means for displaying an image which is arranged between the plurality of display panels; an electrode which applies voltage to the means for displaying the image; and a controller which controls so that voltage is applied to the means for displaying the image based on image information displayed on the plurality of display panels, wherein the plurality of display panels and the means for displaying the image are different elements.

According to an exemplary embodiment, a display method of a video wall apparatus includes displaying an image on a plurality of display panels, and applying voltage to a photonic crystal array which is arranged between the plurality of display panels based on displayed image information.

According to various exemplary embodiments, there is provided the display apparatus which can display a seamless video wall image by employing a means for displaying an image on a bezel area of the display apparatus, the video wall apparatus, the display method and the display method of the video wall apparatus.

BRIEF DESCRIPTION OF THE DRAWINGS

The above and/or other aspects of the present inventive concept will be more apparent by describing certain exemplary embodiments of the present inventive concept with reference to the accompanying drawings, in which:

FIG. 10 is a flowchart provided to explain a display method in a video wall apparatus according to an exemplary embodiment.

DETAILED DESCRIPTION OF EXEMPLARY EMBODIMENTS

Figure 1:
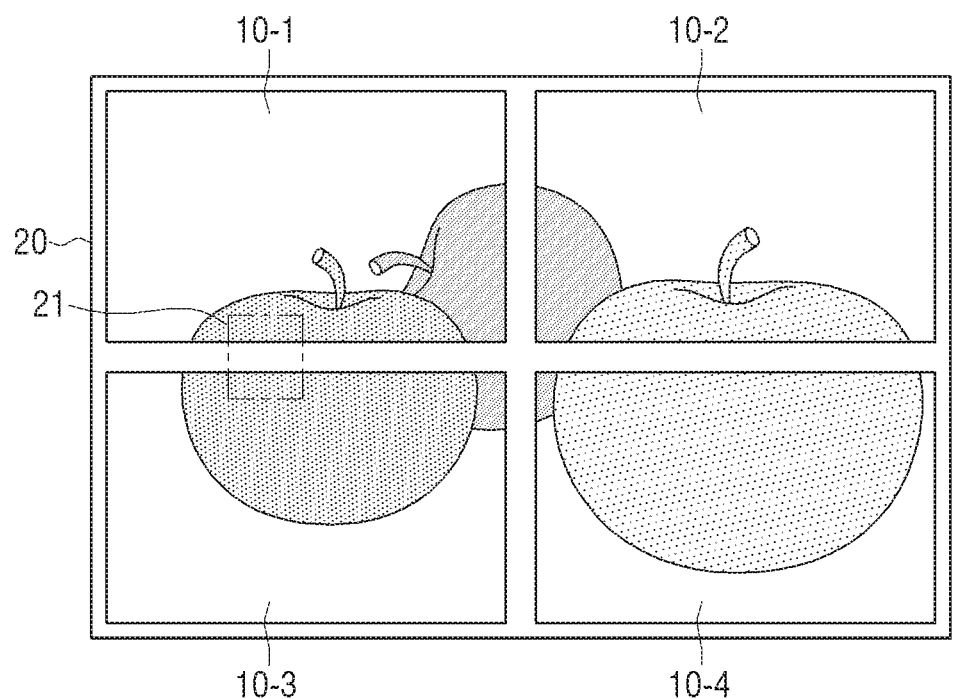
FIG. 1 is a diagram of a conventional video wall.

Certain exemplary embodiments of the present inventive concept will now be described in greater detail with reference to the accompanying drawings.

In the following description, same drawing reference numerals are used for the same elements even in different drawings. The matters defined in the description, such as detailed construction and elements, are provided to assist in a comprehensive understanding of the present inventive concept. Accordingly, it is apparent that the exemplary embodiments of the present inventive concept can be carried out without those specifically defined matters. Also, well-known functions or constructions are not described in detail since they would obscure the invention with unnecessary detail.

Video Wall Apparatus

FIG. 1 is a diagram of a conventional video wall 1.

A video wall is composed of a plurality of display apparatuses and used when each of the display apparatuses constituting the video wall simultaneously displays a uniform image, or respectively displays a different image to be combined and displayed in one whole mobilized image, at venues such as exhibits, etc.

Referring to FIG. 1, four display apparatuses simultaneously display an integrated image about apples. In FIG. 1, each display apparatus displays a part of the integrated apple image through a plurality of display screens 10-1, 10-2, 10-3, 10-4. Each display apparatus includes a bezel 20, and the bezel 20 cannot display image. Thus, because image is not displayed in the bezel 20 of each display apparatus, the integrated image bears seams therein. Specifically, because area 21 where the bezels 20 of each display apparatus meet does not display image and is broader than the edge of the video wall, image discontinuity stands out more clearly at the bezel areas. Due to these parts, a viewer can have eye fatigue and even have a problem in perceiving contents. Thus, the purpose for the displaying of the image(s), such as advertising, can be less effective.

A video wall apparatus 1000 according to an exemplary embodiment solves the above problem.

Figure 2:
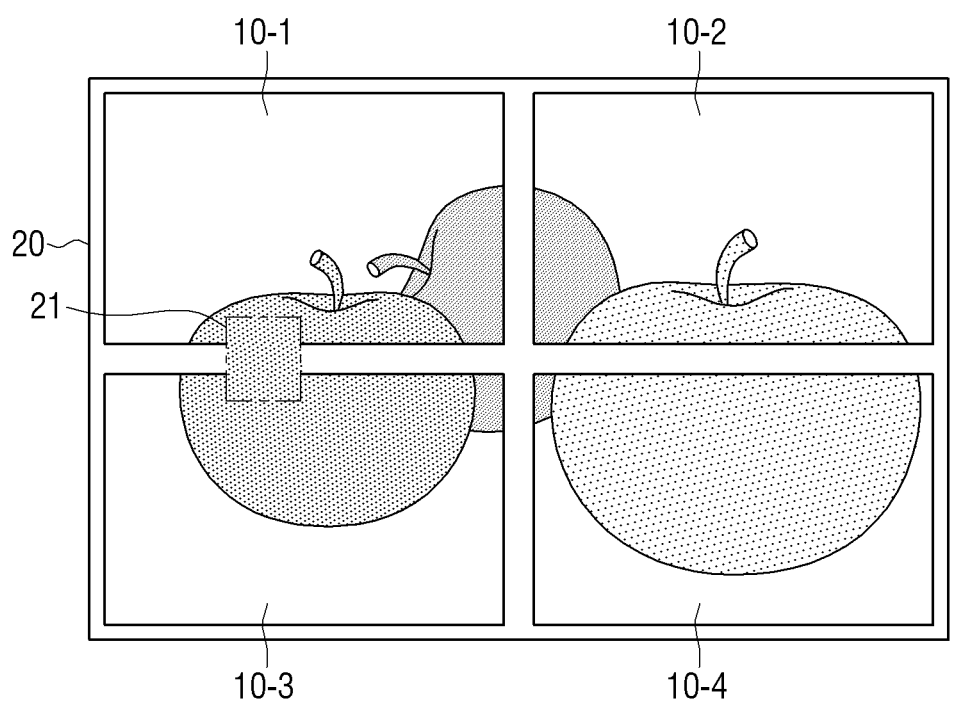
FIG. 2 is a diagram of a video wall apparatus according to an exemplary embodiment.

FIG. 2 is a diagram of the video wall apparatus 1000 according to an exemplary embodiment.

Referring to an exemplary embodiment of FIG. 2, the video wall apparatus 1000 also includes a plurality of display apparatuses like in the video wall apparatus 1 of FIG. 1. Each display apparatus has display panels 10-1, 10-2, 10-3, 10-4 respectively, and is arranged consecutively to each other and displays a constituent image to be integrated into a whole image.

Between the display panels, another display means, which is different from the display panel, is provided. Based on image information of the adjacent display panels, an image is displayed on the different display means. Referring to FIG. 2, one whole apple is displayed over the upper display panel 10-1 and the lower display panel 10-3. Area 21 between the upper display panel 10-1 and the lower display panel 10-3 displays image established based on a part of the apple displayed on the upper display panel 10-1 and a part of the apple displayed on the lower display panel 10-3.

For example, a photonic crystal array may be arranged between the display panels. The photonic crystal array is artificial crystal in which conductive material is arranged periodically. The photonic crystal array shows various colors because frequency of reflecting light is determined based on intervals of crystal grid. Thus, the photonic crystal array may be used in displaying, by adjusting the intervals of grid.

Paper on hydrophobic block-hydrophilic polyelectrolyte block polymer having one-dimensional periodic lamella structure, "Broad-wavelength-range chemically tunable block-copolymer photonic gels, Nature Materials 2007, Vol. 6, No. 12, 957-960", discusses that a position of a stop band can be adjusted by changing periodicity and/or refractive rate of photonic crystal structure.

The video wall apparatus 1000 includes an electrode (not illustrated) for applying voltage to the photonic crystal array, and a controller (not illustrated) of the video wall apparatus 1000 controls the electrode (not illustrated) to apply voltage to the photonic crystal array based on image information displayed on the plurality of display panels.

With the above constitution, a whole image can be viewed seamlessly, and natural video wall can be implemented.

Display Apparatus

The following will explain the constitution and operations of each display apparatus constituting the above video wall apparatus 1000.

Figure 3:
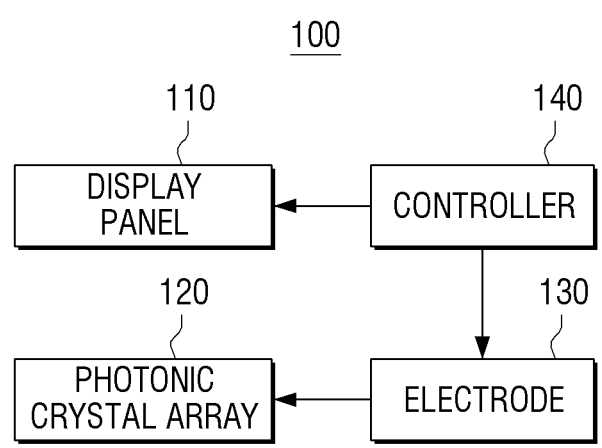
FIG. 3 is a block diagram of a display apparatus according to an exemplary embodiment.

FIG. 3 is a block diagram of a display apparatus according to an exemplary embodiment.

Referring to FIG. 3, a display apparatus 100 according to an exemplary embodiment includes a display panel 110, a photonic crystal array 120, an electrode 130, and a controller 140.

The display panel 110 is constructed to display an image. The display panel may be implemented with various display technologies such as organic light emitting diodes (OLED), liquid crystal display panel (LCD panel), plasma display panel (PDP), vacuum fluorescent display (VFD), field emission display (FED), or electro luminescence display (ELD). A display panel is usually made as emissive type; however, a reflective type display such as E-ink, P-ink, and photonic crystal may not be excluded. Further, a flexible display or transparent display can be implemented.

The photonic crystal array 120 is arranged on at least one side of the display panel 110 and displays an image according to the applied voltage. Because the photonic crystal array 120 is arranged for an objective to display an image seamlessly, the photonic crystal array 120 is mounted on one side of the display panel 110 or placed between a plurality of display panels, if needed. Hereinbelow, exemplary embodiments are explained by focusing on the photonic crystal array; however, another means that can perform display function may be substituted.

The electrode 130 applies voltage to the photonic crystal array 120. As described above, if voltage is applied to the photonic crystal array 120, a position of a stop band can be adjusted by changing periodicity and/or refractive rate. Thus, color may be displayed reversibly. The electrode 130 is controlled by the controller 140.

The controller 140 controls the photonic crystal array 120 so that voltage is applied to the photonic crystal array 120 based on image information displayed on the display panel 110. Besides, the controller 140 controls general implementations of the display apparatus 100, and specifically, controls a display operation to display an image on the display panel 110 as explained below.

However, according to an exemplary embodiment, the controller 140 of the photonic crystal array 120 and a controller of the display panel 110 may operate independently. For example, if a video wall is composed of a plurality of extensive display apparatuses, a display panel of each display apparatus may be operated according to the control of a controller in each display apparatus, and operation of the photonic crystal array 120 may be controlled by another separate controller.

Meanwhile, the display apparatus 100 may be a circuit unit which outputs an image to the display panel 110, and may further include a timing controller (not illustrated), a gate driver (not illustrated), a data driver (not illustrated), and a voltage driver (not illustrated).

The timing controller (not illustrated) generates gate controlling signals (passing controlling signals) and data controlling signals (data signals), rearranges inputted R, G, B data, and provides to the data driver (not illustrated).

The gate driver (not illustrated) applies a gate on/off voltage (Vgh/Vgl) provided from the voltage driver (not illustrated) to the display panel 110 according to gate controlling signals generated by the timing controller (not illustrated).

After scaling according to data controlling signals generated by the timing controller (not illustrated) is completed, the data driver (not illustrated) inputs RGB data of image frame to the display panel 110.

The voltage driver (not illustrated) generates and delivers corresponding driving voltage to the gate driver (not illustrated), the data driver (not illustrated), and the display panel 110.

Each constitution of the image output circuit is considered to be out of technical essence, and will not be described in detail.

Meanwhile, the display apparatus 100 may further include a bezel mounted on a side area of the display panel 110, and the above photonic crystal array 120 may be formed on one area of the bezel.

Figure 4:
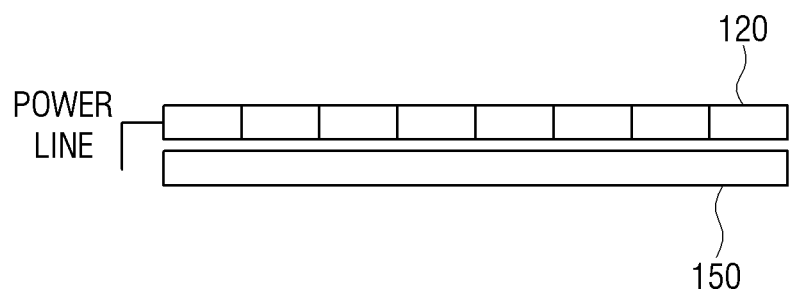
FIG. 4 is a cross-section view illustrating arrangement of a photonic crystal array and a bezel according to another exemplary embodiment.

FIG. 4 is a diagram illustrating an arrangement of the photonic crystal array 120 and a bezel 150 according to another exemplary embodiment.

Referring to FIG. 4, the photonic crystal array 120 may be arranged on the upper portion of the bezel 150. Further, the photonic crystal array 120 may have another electrical power line. Such arrangement enables easier forming of a video wall with universal-purpose display apparatuses, i.e., without requiring special display apparatuses devoted to a video wall. The universal-purpose display apparatuses may be placed side by side and the photonic crystal array 120 may be mounted on the bezel of the display apparatuses. Thus, a video wall can be constituted more efficiently at a lower cost.

The following will explain a method of displaying image on the photonic crystal array 120.

An objective of the photonic crystal array 120 is to implement a seamless image. Therefore, an image displayed on the photonic crystal array 120 should be generated by considering an image displayed on the adjacent display panel 110. In other words, the controller 140 controls the electrode 130 to apply voltage to the photonic crystal array 120 based on color information of image displayed on predetermined area of the display panel 110. The detailed process will be explained by referring to FIG. 5.

Figure 5:
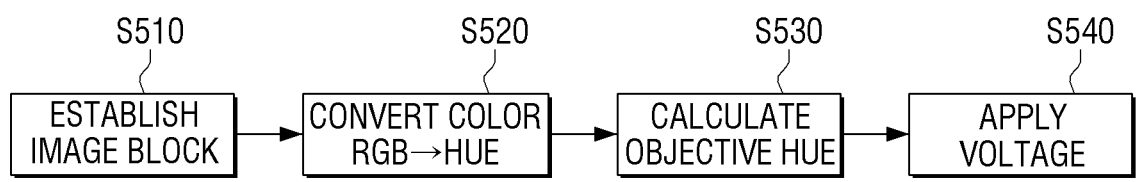
FIG. 5 is a block diagram of a method for displaying image on a photonic crystal array according to an exemplary embodiment.
Figure 6:
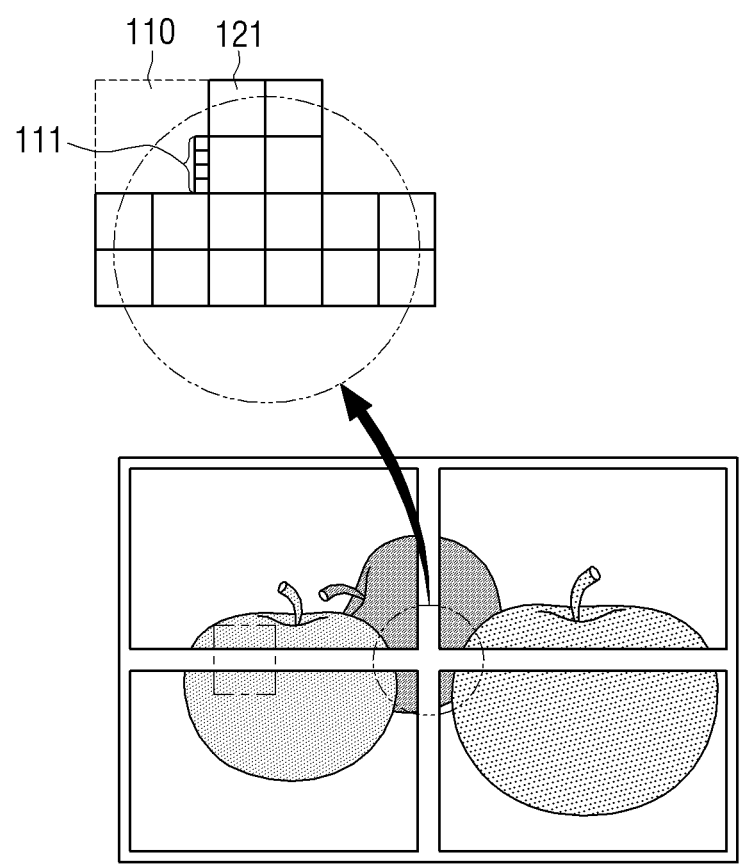
FIG. 6 is a diagram provided to explain a display method according to the method of FIG. 5.

FIG. 5 is a block diagram of a method of displaying image on the photonic crystal array according to an exemplary embodiment, and FIG. 6 is a diagram explaining a display method according to FIG. 5.

Referring to FIG. 5, the controller 140 establishes a predetermined area of the display panel 110 as an image block at S510. The above established image block corresponds to an area of the display panel 110 where an image to be considered for displaying on the photonic crystal array 120 is displayed. Referring to FIG. 6, to generate an image on one area 121 of the photonic crystal array 120, area 111 of the adjacent display panel may be established as an image block.

At S520, the controller 140 may convert pixel values of the above established image block to a pixel value in Hue type. Pixel values of the image block, i.e., colors shown on the display panel, can be expressed in various color coordinates. For example, a RGB color coordinate is created by combining basic colors, red, green and blue. A CMY color coordinate uses a color coordinate constituting RGB complementary colors. A CMY color coordinate can be simply converted to a RGB color coordinate. A YUV color coordinate is used in a European video standard regarding digital video. A YUB color coordinate is expressed with brightness, luminosity and chromaticity, and converted to RGB. A YCbCr color coordinate is used in JPEG and MPEG, and can express a color dimension and a color image efficiently.

The above color coordinates have a plurality of values which can be converted to a single pixel value in Hue type. A pixel value in Hue type is widely used because it involves a simple calculation. If pixel values of the above established image block are expressed in RGB pixel values, they are converted to a pixel value in Hue type at first.

At S530, the controller 140 calculates an average from pixel values of the above established image block or pixel values having the highest frequency in the above established image block. If pixel values of the image block are linear, an average of the above image block can be calculated. For example, if a predetermined area of an apple displayed on a center area of the video wall in FIG. 6 is created in red, an average from pixel values of the area may be calculated so as to similarly display an area of the photonic crystal array in red. However, if pixel values of the image block are nonlinear, a pixel value having the highest frequency may be calculated from the above established image block. In other words, a most dominant pixel value is calculated from the image block. For example, if a predetermined area of an apple displayed on a center of the video wall is created in various colors, a pixel value corresponding to red which is the most dominant color is calculated.

The controller 140 controls the electrode 130 to apply a voltage corresponding to the above calculated pixel value to the photonic crystal array 120 at S540.

The following will explain structure of the photonic crystal array.

Figure 7:
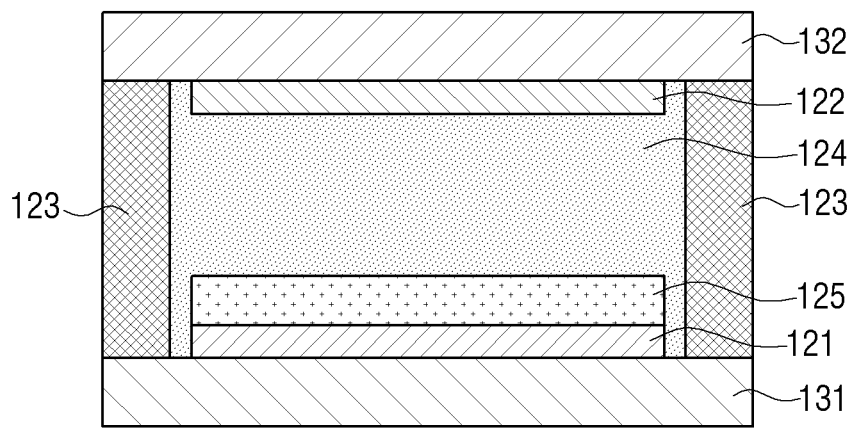
FIG. 7 is a cross-section view illustrating a structure of a unit cell in a photonic crystal array.

FIG. 7 is a diagram illustrating a unit cell structure of the photonic crystal array.

Referring to FIG. 7, a unit cell 120-1 of the photonic crystal array includes a lower board 131, an upper board 132, spacers 123, first and second electrodes 121, 122 formed on each board, a lower board 131, an upper board 132, an electro solvent 124 filled in pixel area defined by the spacers 123 on both sides, and a photonic crystal 125.

Material of the lower board 131 and the upper board 132 may be selected from the group constituting of glass, metal, plastic and silicon. However, it is not limited to herein; if flexibility is necessary, a flexible polymer film is possible with regard to plastic material or metal foil is possible with regard to metal material. Because the material is used for displaying, at least one of the lower board 131 and the upper board 132 may be implemented as transparent material.

On the lower board 131 or the upper board 132, thin film transistors (not illustrated) as switching components and a pixel electrode to display image pixels such as the first electrode 121 or the second electrode 122 may be formed in matrix type, and gate line and data line may be formed to be orthogonally crossed so as to operate the plurality of thin film transistors.

The spacers 123 are used to maintain the thin upper and lower boards at a specific gap to prevent breakage or bending of the thin upper and lower boards. The spacers 123 are insulators such as polyimide or photosensitive glass. In one exemplary embodiment, the spacers 123 also perform a role of a bank for printing photonic crystal solution when display components are array-processed, and accordingly material of the spacers 123 should be durable in a solution annealing process to form a periodic structure of photonic crystal substrate. Therefore, the material may be the one that easily forms a pattern, has durability and resistance to an annealing solution, and thus has hydrophobicity for a printing process. For an example of photosensitive material, material for composition may be the one that can have hydrophobicity by adding ammonium dichromate as a photoinitiator to a polyvinyl alcohol solution, and adding a water soluble fluorine polymer material, or photocrosslinkable organic thin film material such as PC403 (JSR) is possible.

The first electrode 121 and the second electrode 122 are formed on the lower board 131 and the upper board 132, respectively, and apply voltage between the two boards. In the manufacturing of the first electrode 121 or the second electrode 122, any material having high conductivity may be used without limitations, and metal material may be used primarily. Further, on an incidence or reflection path to or from the unit cell 120-1, transparent electrodes may be formed on a transparent board, and ITO, FTO, $SnO_2$ and ZnO may be used. The second electrode 122 is opposed to the first electrode 121 in each unit cell 120-1.

The electro solvent 124 is a medium which makes chemical tuning of the unit cell 120-1 possible, and performs a role of forming inclination of ionic concentration according to voltage between the first electrode 121 and the second electrode 122. The material type of the electro solvent 124 may not be limited, provided that ionic concentration of the material changes according to an added voltage; aqueous solution which salts are dissolved or ionic water may be used—for example, ionic organic solvent such as imidazolium may be used.

The photonic crystal 125 is a medium which substantially performs driving of the reflecting type display according to an exemplary embodiment. The photonic crystal 125 is stacked on the lower board 131 and contacts the electro solvent 124. Because this material may have a one-dimensional, two-dimensional, or three-dimensional periodic structure between domains divided by areas which are different in terms of physical features or chemical features, a position of a stop band reflected from an electromagnetic wave is determined according to periodicity. Within the photonic crystal 125, there are two kinds of domains. A stop band becomes bigger as the difference in refractive rates between these two kinds of domains increases.

The material used for the photonic crystal 125 is not limited, provided that the material has a periodic structure of a domain which can be changed reversibly to influence electromagnetic radiation by external stimulation—for example, electrical stimulation or changes in ionic concentration. Amphiphilic diblock copolymer constituting a hydrophobic block polymer and a hydrophilic block polymer can be used. Such amphiphilic diblock copolymer may be a self-assembled stratiform structure.

If the photonic crystal array is formed by properly selecting material for the photonic crystal 125 and type of the electro solvent 124 and by arranging the unit cell 120-1 of the plural photonic crystal arrays, it can implement a system that adjusts colors electrochemically and reversibly within whole range of visible light rays by applying proper voltage per unit cell 120-1 of the photonic crystal array through the electrodes.

The video wall apparatus may be implemented by employing a plurality of the above methods.

Figure 8:
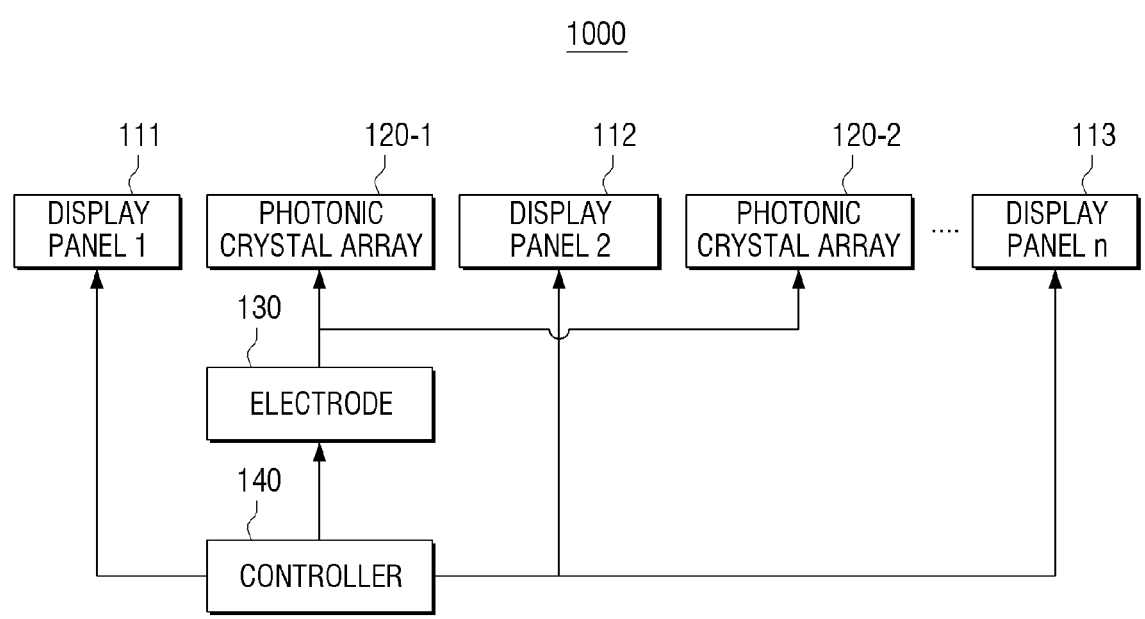
FIG. 8 is a block diagram of a video wall apparatus described above.

FIG. 8 is a block diagram of the video wall apparatus 1000.

Referring to FIG. 8, the video wall apparatus 1000 according to an exemplary embodiment includes a plurality of display panels 111, 112, 113, and photonic crystal arrays 120-1 and 120-2 which are arranged between the plurality of display panels 111, 112, 113 and a display image by applied voltage. Further, the video wall apparatus 1000 includes an electrode 130 which applies voltage to the photonic crystal arrays and a controller 140 which controls applying voltage to the photonic crystal arrays based on image information displayed on the plurality of display panels 111, 112, 113.

Each unit of the video wall apparatus 1000 can be understood with the same meaning from the previous descriptions, which will not be further explained to avoid overlapping.

Display Method

The following will explain a display method and a display method of a video wall apparatus according to various exemplary embodiments.

Figure 9:
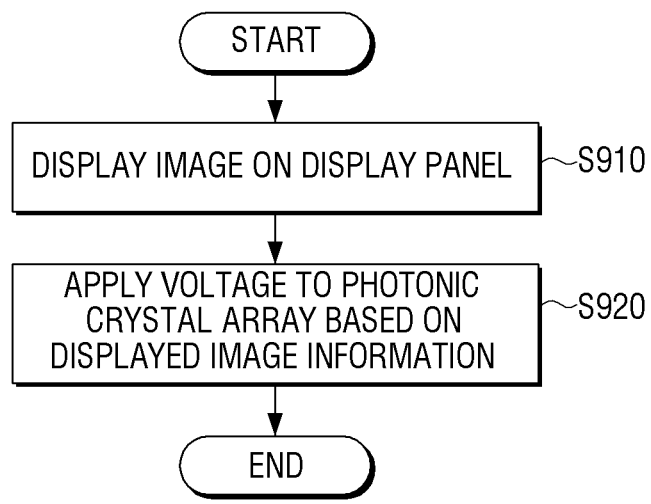
FIG. 9 is a flowchart provided to explain a display method according to an exemplary embodiment.

FIG. 9 is a flowchart provided to explain a display method according to an exemplary embodiment.

Referring to FIG. 9, the display method according to an exemplary embodiment includes displaying an image on a display panel at S910 and applying voltage to a photonic crystal array based on the displayed image information at S920.

At this process, the photonic crystal array is arranged on at least one side of the display panel and displays image by the applied voltage.

Further, the photonic crystal array may be arranged on one area of a bezel mounted on the edge of the display panel.

Meanwhile, voltage may be applied to the photonic crystal array based on color information of the image displayed on predetermined area of the display panel. Specifically, applying the voltage may be performed by establishing predetermined area of the display panel as image block, converting pixel values of the established image block to a pixel value in Hue type, calculating average from pixel values of the established image block or calculating pixel value having the highest frequency from the established image block, and applying voltage corresponding to the calculated pixel value to the photonic crystal array.

At this step, the photonic crystal array includes an electro solvent whose ionic concentration changes by the applied voltage and a photonic crystal which contacts the electro solvent.

Further, a photonic crystal is a material whose domain periodic structure can be changed reversibly so as to influence electromagnetic radiation by electro stimulation or by changes in ionic concentration, and may be a diblock copolymer constituting hydrophobic block polymer and hydrophilic block copolymer.

FIG. 10 is a flowchart illustrating a display method of a video wall apparatus according to an exemplary embodiment.

Referring to FIG. 10, the display method of the video wall apparatus according to an exemplary embodiment includes displaying an image on a plurality of display panels at S1010 and applying voltage to a photonic crystal array formed between the plurality of display panels based on the displayed image information at S1020.

Each step and more detailed steps are already described regarding the above display apparatus and the video wall apparatus, and these steps will not be further explained to avoid overlapping.

Recording Medium

The above described display method and/or the display method of the video wall apparatus can be implemented by programs including algorithms that can run on a computer, and the programs may be stored and provided in non-transitory computer readable medium.

A non-transitory readable medium may indicate a medium which stores data semi-permanently and can be read by devices, not a medium storing data temporarily such as register, cache, or memory. Specifically, the above various applications or programs may be stored and provided in non-transitory readable medium such as compact disk (CD), digital versatile disk (DVD), hard disk, Blu-ray disk, universal serial bus (USB), memory card, or read-only memory (ROM).

Further, the foregoing exemplary embodiments and advantages are merely exemplary and are not to be construed as limiting the present invention. The present teaching can be readily applied to other types of apparatuses. Also, the description of the exemplary embodiments of the present inventive concept is intended to be illustrative, and not to limit the scope of the claims.

What is claimed is:

1. A display apparatus, comprising:
a display panel;
a photonic crystal array which is arranged on at least one side of the display panel and which displays an image;
an electrode which applies voltage to the photonic crystal array; and
a controller which controls so that voltage is applied to the photonic crystal array based on color information of the image which is displayed on a predetermined area of the display panel.

2. The display apparatus of claim 1, further comprising:
a bezel which is arranged on an edge of the display panel, wherein the photonic crystal array is arranged on at least one area of the bezel.

3. The display apparatus of claim 1, wherein the controller establishes a predetermined area of the display panel as an image block, calculates an average pixel value from pixel values of the established image block or calculates a pixel value having a highest frequency from the established image block, and controls so that voltage is applied to the photonic crystal array according to the calculated pixel value.

4. The display apparatus of claim 1, wherein the controller establishes a predetermined area of the display panel as an image block, converts pixel values of the established image block into a pixel value in Hue type, calculates an average pixel value from the converted pixel values or calculates a pixel value having a highest frequency from the converted pixel values, and controls so that voltage is applied to the photonic crystal array according to the calculated pixel value.

5. The display apparatus of claim 1, wherein the photonic crystal array comprises:
an electro solvent which changes ionic concentration in response to the applied voltage; and
a photonic crystal which contacts the electro solvent.

6. The display apparatus of claim 5, wherein the photonic crystal is a material whose domain periodic structure can change reversibly so as to influence electromagnetic radiation in response to one from among an electrical stimulation and changes in ionic concentration, and is a diblock copolymer constituting a hydrophobic block polymer and a hydrophilic block polymer.

7. A video wall apparatus comprising a plurality of the display apparatuses, at least one of the plurality of the display apparatuses comprising:
a display panel;
a photonic crystal array which is arranged on at least one side of the display panel and which displays an image;
an electrode which applies voltage to the photonic crystal array; and
a controller which controls so that voltage is applied to the photonic crystal array
based on color information of the image which is displayed on a predetermined area of the display panel.

8. A video wall apparatus, comprising:
a plurality of display panels;
a photonic crystal array which is arranged between the plurality of display panels and which displays an image;
an electrode which applies voltage to the photonic crystal array; and
a controller which controls so that voltage is applied to the photonic crystal array based on color information of the image which is displayed on a predetermined area of at least one of the plurality of display panels.

9. A display method, comprising:
displaying a first image on a display panel; and
applying voltage to a photonic crystal array based on color information of the first image displayed on a predetermined area of the display panel,
wherein the photonic crystal array is arranged on at least one side of the display panel and displays a second image based on the applied voltage.

10. The display method of claim 9, wherein the photonic crystal array is arranged on at least one area of a bezel mounted on an edge of the display panel.

11. The display method of claim 9, wherein the applying voltage comprises:
establishing a predetermined area of the display panel as an image block;
calculating an average pixel value from pixel values of the established image block or calculating a pixel value having a highest frequency from the established image block; and
applying the voltage to the photonic crystal array according to the calculated pixel value.

12. The display method of claim 9, wherein the applying voltage comprises:
establishing a predetermined area of the display panel as an image block;
converting pixel values of the established image block to a pixel value in Hue type;
calculating an average pixel value from the converted pixel values or calculating a pixel value having a highest frequency from the converted pixel values; and
applying voltage to the photonic crystal array according to the calculated pixel value.

13. The display method of claim 9, wherein the photonic crystal array comprises:
an electro solvent which changes ionic concentration in response to the applied voltage; and
a photonic crystal which contacts the electro solvent.

14. The display method of claim 13, wherein the photonic crystal is a material whose domain periodic structure can change reversibly so as to influence electromagnetic radiation by electrical stimulation or by changes in ionic concentration, and is a diblock copolymer constituting a hydrophobic block polymer and a hydrophilic block polymer.

15. A display method of a video wall apparatus, comprising:
displaying an image on a plurality of display panels; and
applying voltage to a photonic crystal array which is arranged between the plurality of display panels based on color information of the image which is displayed on a predetermined area of at least one of the plurality of display panels.

16. A display apparatus, comprising:
a display panel;
means for displaying an image which is arranged on at least one side of the display panel;
an electrode which applies voltage to the means for displaying the image; and
a controller which controls so that voltage is applied to the means for displaying the image based on color information of the image which is displayed on a predetermined area of the display panel,
wherein the display panel and the means for displaying the image are different elements.

17. A video wall apparatus comprising a plurality of the display apparatuses, at least one of the plurality of the display apparatuses comprising:
- a display panel;
- means for displaying an image which is arranged on at least one side of the display panel;
- an electrode which applies voltage to the means for displaying the image; and
- a controller which controls so that voltage is applied to the means for displaying the image based on color information of the image which is displayed on a predetermined area of the display panel,
- wherein the display panel and the means for displaying the image are different elements.

18. A video wall apparatus, comprising:
- a plurality of display panels;
- means for displaying an image which is arranged between the plurality of display panels;
- an electrode which applies voltage to the means for displaying the image; and
- a controller which controls so that voltage is applied to the means for displaying the image based on color information of the image which is displayed on a predetermined area of at least one of the plurality of display panels,
- wherein the plurality of display panels and the means for displaying the image are different elements.

* * * * *